(12) United States Patent
Dees et al.

(10) Patent No.: US 12,401,996 B2
(45) Date of Patent: Aug. 26, 2025

(54) ACCESS TO HEALTH INFORMATION DURING EMERGENCY CALL

(71) Applicant: KONINKLIJKE PHILIPS N.V., Eindhoven (NL)

(72) Inventors: Walter Dees, Eindhoven (NL); Vignesh Raja Krauppiah Ramachandran, Mol (BE)

(73) Assignee: Koninklijke Philips N.V., Eindhoven (NL)

(*) Notice: Subject to any disclaimer, the term of this patent is extended or adjusted under 35 U.S.C. 154(b) by 428 days.

(21) Appl. No.: 17/607,081

(22) PCT Filed: Apr. 20, 2020

(86) PCT No.: PCT/EP2020/060965
§ 371 (c)(1),
(2) Date: Oct. 28, 2021

(87) PCT Pub. No.: WO2020/221611
PCT Pub. Date: Nov. 5, 2020

(65) Prior Publication Data
US 2022/0232373 A1    Jul. 21, 2022

(30) Foreign Application Priority Data
Apr. 30, 2019   (EP) .................................... 19171734

(51) Int. Cl.
*H04W 12/033*        (2021.01)
*G06F 21/62*         (2013.01)
(Continued)

(52) U.S. Cl.
CPC ...... *H04W 12/033* (2021.01); *G06F 21/6263* (2013.01); *H04M 3/5116* (2013.01);
(Continued)

(58) Field of Classification Search
CPC ..... H04W 12/033; H04W 4/90; H04W 4/023; G06F 21/6263; H04M 3/5116;
(Continued)

(56) References Cited

U.S. PATENT DOCUMENTS 6,686,735 B2    2/2004  Daalmans
7,047,022 B2 *  5/2006  Aoyama ............... G01S 5/0072
                                                455/456.6
(Continued)

FOREIGN PATENT DOCUMENTS

JP    2001357480 A    12/2001
JP    2013077326 A    4/2013
(Continued)

OTHER PUBLICATIONS

"Khaled Rabieh", "Kemal Akkaya", "Umit Karabiyik", "Jennifer Qamruddin", "A secure and Cloud-based Medical Records Access Scheme for on-Road Emergencies" pp. 1-8 (Year: 2018).*

(Continued)

*Primary Examiner* — Darshan I Dhruv

(57) ABSTRACT

A mobile device (110) and an emergency entity (120) in a mobile network (130) accommodate emergency calls. The network is coupled to a medical database (140) comprising respective electronic health records (EHR) regarding respective persons. The mobile device is arranged to obtain the encrypted medical identifier of a user of the device; and, upon establishing that the user may be a victim of the emergency, to include the encrypted medical identifier in the emergency message during an emergency call. The emergency entity is arranged to retrieve the encrypted medical identifier from the emergency message, and to access the medical database to retrieve at least one electronic health record based on the encrypted medical identifier for enabling (Continued)

forwarding of information from the electronic health record to responders to an emergency.

10 Claims, 5 Drawing Sheets

(51) Int. Cl.
*H04M 3/51* (2006.01)
*H04W 4/02* (2018.01)
*H04W 4/90* (2018.01)
(52) U.S. Cl.
CPC .............. *H04W 4/023* (2013.01); *H04W 4/90* (2018.02); *H04M 2203/6009* (2013.01); *H04M 2207/182* (2013.01); *H04M 2242/04* (2013.01)
(58) Field of Classification Search
CPC ... H04M 2203/6009; H04M 2207/182; H04M 2242/04
See application file for complete search history.

(56) References Cited

U.S. PATENT DOCUMENTS

| | | | | |
|---|---|---|---|---|
| 10,204,704 | B1* | 2/2019 | Wurst | G16H 10/20 |
| 2005/0107673 | A1* | 5/2005 | Ball | A61B 5/002 |
| | | | | 600/301 |
| 2010/0115609 | A1* | 5/2010 | Spence | G06F 21/78 |
| | | | | 726/19 |
| 2010/0266129 | A1 | 10/2010 | Tsuchiya | |
| 2010/0279647 | A1* | 11/2010 | Jacobs | H04B 7/15507 |
| | | | | 455/404.1 |
| 2011/0111726 | A1* | 5/2011 | Kholaif | H04W 76/50 |
| | | | | 455/456.2 |
| 2012/0046862 | A1* | 2/2012 | Griffin | H04L 51/222 |
| | | | | 701/521 |
| 2012/0064855 | A1* | 3/2012 | Mendelson | G01S 1/68 |
| | | | | 455/404.1 |
| 2014/0025394 | A1* | 1/2014 | Aoki | G16H 40/67 |
| | | | | 705/2 |
| 2015/0011247 | A1* | 1/2015 | Ezra | G06F 3/0227 |
| | | | | 455/456.3 |
| 2015/0288797 | A1* | 10/2015 | Vincent | G16H 10/60 |
| | | | | 455/404.2 |
| 2016/0057595 | A1* | 2/2016 | Ahmed | H04W 4/90 |
| | | | | 455/404.1 |
| 2017/0094490 | A1* | 3/2017 | Ryan | H04W 4/90 |
| 2017/0310827 | A1* | 10/2017 | Mehta | H04W 80/04 |
| 2017/0339541 | A1* | 11/2017 | Shen | H04W 4/90 |
| 2018/0137936 | A1* | 5/2018 | Experton | G16H 40/67 |
| 2018/0286501 | A1* | 10/2018 | Marin | G06F 16/951 |
| 2019/0069145 | A1* | 2/2019 | Dantsker | G06F 40/169 |
| 2019/0088114 | A1* | 3/2019 | Kumhyr | G08G 1/0112 |
| 2019/0213581 | A1* | 7/2019 | Zarakas | G06F 3/017 |
| 2019/0281165 | A1* | 9/2019 | Mehta | H04W 4/90 |
| 2020/0184738 | A1* | 6/2020 | Ngo | H04W 4/90 |
| 2021/0150051 | A1* | 5/2021 | van'T Noordende | H04L 63/18 |

FOREIGN PATENT DOCUMENTS

| | | |
|---|---|---|
| JP | 2014153724 A | 8/2014 |
| JP | 2016052022 A | 4/2016 |
| WO | WO03054762 A1 | 7/2003 |

OTHER PUBLICATIONS

Kleeman et al "Mobile SIM Based Medical Applications" GSMA Feb. 2015.

Khaled et al "A Secure and Cloud Based Medical Records Acess Scheme for On-Road Emergencies" 2018 15th IEEE Annual Consumer Communications and Networking Conference Jan. 12, 2018 p. 1-8.

Search Report and Written Opinion from PCT/EP2020/060965 mailed Nov. 5, 2020.

* cited by examiner

ACCESS TO HEALTH INFORMATION DURING EMERGENCY CALL

CROSS REFERENCE TO RELATED APPLICATIONS

This application is a U.S. national phase application of International Application No. PCT/EP2020/060965 filed on Apr. 20, 2020, which claims the benefit of EP Application Serial No. 19171734.7 filed on Apr. 30, 2019 and are incorporated herein by reference.

FIELD OF THE INVENTION

The invention relates to a mobile device arranged for wireless communication in a mobile network, the mobile network providing wireless communication for mobile devices across at least a regional area according to a network communication protocol. The network communication protocol enables calls between subscribers to the network. The calls comprise emergency calls between mobile devices and an emergency entity. An emergency call setup is initiated upon a mobile device performing an emergency action, such as calling the emergency number 112 or 911. The network is coupled to a medical database comprising respective electronic health records (EHR) regarding respective persons, each person having a respective medical identifier linking the person to the respective electronic health records. The invention further relates to the emergency entity and a network entity, and methods for use in such devices and entities.

The present invention relates to the field of well-known regional area mobile communication systems, which may be called core networks, e.g. 3G, LTE, 4G or 5G networks. Access to core networks is managed by so-called providers or mobile network operators (MNO), which provide access to core networks for mobile devices of subscribers using a set of subscriber data called the subscriber identity SI. The SI comprises subscriber identity data for accessing a core network, for a respective subscriber to the provider. Commonly mobile devices like smartphones are equipped with a dedicated transceiver for communication with a core network and are further provided with the subscriber identity, SI. The SI represents the identity of a subscriber and further data required to access the core network, while use of the core network is billed by the provider to the respective subscriber, e.g. via a so-called bundle of voice and data. For example, the SI may comprise a subscriber identity code like IMSI (International Mobile Subscriber Identity). Such devices usually are provided with the SI by inserting a physical semiconductor module called SIM into the mobile device. A SIM card is an integrated circuit embedded in a plastic card that is intended to securely store the international mobile subscriber identity (IMSI) number and its related keys, which are used to identify and authenticate subscribers on mobile telephony devices (such as mobile phones and computers). Various types of modules or cards are known, e.g. USIM which refers to Universal Subscriber Identity Module and works on UMTS Universal Mobile Telecommunications System, which is a 3G core network standard. The related physical card is also known as UICC (Universal Integrated Circuit Card) and USIM is an application running on top of UICC. A further type of SIM is called e-SIM or eSIM (embedded SIM) or embedded universal integrated circuit card (eUICC). It is a non-replaceable embedded chip that is soldered directly onto a circuit board. For now, any type of device that is equipped for wireless communication with a core network and is provided with a SI, either via a SIM card or otherwise, is called a SIM device in this document.

BACKGROUND OF THE INVENTION

The document "Mobile SIM-based Medical Applications by Michael J. Kleeman, Martin Harris and James Erasmus, GSMA, February 2015", shows some mechanisms to allow access to medical information stored on a device's SIM card through the use of a standardized SIM Toolkit application. However, only a limited amount of medical information may be stored on the SIM, while controlling the access is complicated, as elucidated in the document. In particular privacy may be problematic.

However, during emergencies every second counts. It often takes time to identify the patient and get relevant medical information of that patient (e.g. medical history, medicine use, whether or not patient wishes to be resuscitated, etc.) to first responders such as ambulance personnel. It is more and more common that this information is stored in a person's Electronic Health Record (EHR) somewhere in a medical database. It would be very beneficial if this information would be readily available to emergency responders, such as health workers or doctors arriving at the scene of an emergency.

The mechanisms and organizational structure as described in the above mentioned document to deploy standardized SIM toolkit applications are quite complicated. It would be beneficial to have a simpler solution for accessing electronic heath records in the event of an emergency for enabling forwarding of information from the electronic health records to responders to an emergency, such as the police or ambulance personnel.

SUMMARY OF THE INVENTION

It would be beneficial to use the time between the moment an emergency call is made to an emergency entity and the moment first responders arrive at the scene, to retrieve the necessary information from the EHR and feed this to the first responders before they arrive at the accident scene. The above mentioned document does not describe any mechanism to handle emergency calls. It would also be beneficial for privacy and confidentiality reasons if providing such data would not depend on the MNO having knowledge about the identity or credentials being used to access the EHR or that the MNO would be able to gain access to the EHR. It is important to note that emergency calls are handled differently from normal calls and may be less secure, while the user identity may not be involved, i.e. anyone should be able to call emergency number without subscription. Hence, security is an important considering to prevent any sensitive information related to the person's EHR would fall in the wrong hands.

It is an object of the invention to provide a system for reliably accessing EHR in the event of an emergency, while the above aspects are taken into account.

According to a further aspect of the invention there is provided a computer program product downloadable from a network and/or stored on a computer-readable medium and/or microprocessor-executable medium, the product comprising program code instructions for implementing the above method when executed on a computer.

The mobile device is arranged for wireless communication in a mobile network. The mobile network provides wireless communication for mobile devices across at least a regional area according to a network communication protocol. The network communication protocol enables calls between subscribers to the network. The calls comprise emergency calls between mobile devices and an emergency entity, an emergency call setup being initiated upon a mobile device performing an emergency action, e.g., the caller dialing the regional emergency number such as 112 or 911, or a mobile device embedded in a car may dial after detecting an accident based on strong deceleration.

The network is coupled to a medical database comprising respective electronic health records (EHR) regarding respective persons. The medical database may be provided by a mobile network operator, or on a server coupled to the network, but the medical database may also be accessed via another network or device (e.g. operated by the emergency entity), for example via a dedicated coupling device or link.

Each person has a respective medical identifier linking the person to the respective electronic health records. It is to be noted that the medical identifier differs from the subscriber identity, as the SI is substantially public and already known to the network and network operator. Known SI data like the SIM card unique identifier (i.e. International Mobile Subscriber Identity (IMSI), Subscription Permanent Identifier (SUPI), Temporary Mobile Subscriber Identity (TMSI) or Globally Unique Temporary User Equipment Identity (GUTI)), are not suitable as such for accessing the medical database as privacy aspects cannot be taken into account. It would also make it quite difficult for the user to switch to another network operator. In an embodiment, the medical identifier is encrypted using a security credential that is not known to the network operator, and only the emergency entity or healthcare provider or first responder has access to the key material to decrypt the medical identifier. The encrypted medical identity may comprise a medical credential for accessing the electronic health records or specific electronic health records regarding emergencies of the respective person. Also, accessing the medical database may be based on a combination of subscriber identity data and the encrypted medical identity, and may be based on security credentials (e.g. passwords, pre-shared keys, private keys) known to the emergency entity, the user, the network operator, the healthcare provider, the first responder or a combination thereof.

The emergency entity is arranged to retrieve an encrypted medical identifier from an emergency message, and to access the medical database to retrieve at least one electronic health record (EHR) based on the encrypted medical identifier for enabling forwarding of information from the electronic health record (EHR) to responders to an emergency. The emergency entity may be arranged to decrypt the encrypted medical identifier, e.g. by providing the medical entity with key material. Various systems for encrypting the medical identifier are known as such, e.g. using a public key for encrypting the medical identifier while the emergency entity is provided with the corresponding private key. Alternatively, the key material may be available and be processed only at the medical database, to which only a restricted set of people have been given access (e.g. through login by username/password).

The mobile device comprises a network communication unit for enabling calls via the network, and a secure processor arranged to obtain the encrypted medical identifier of a user of the device; and, upon establishing that the user may be a victim of the emergency, to include the encrypted medical identifier in the emergency message during an emergency call. For example, the mobile device may access a local secure storage in the device, e.g. on the SIM, to retrieve the encrypted medical identifier. Also, the mobile device may access a secure storage via the network, e.g. a Home Subscriber Server (HSS) at the premises of the mobile operator maintaining a database that provides the details of the subscribers to other entities within the cellular network. Also, as part of said obtaining, the mobile device may encrypt the medical identifier to generate the encrypted medical identifier (e.g. by configuring encryption credentials on the phone through an application (e.g. running as part of the SIM toolkit) or a secure out-of-band channel such as NFC or reading a dynamically generated QR code).

The above features have the following effects. The EHR identification data is received as part of the cellular emergency communication session setup. The EHR of the victim of the emergency may be accessed immediately, so that no time is lost between receiving an emergency message and fetching possibly life-saving patient health information to be used by first responders. The advantageous effects require that the person in distress has previously made provisions to let emergency responders gain access to their EHR information, such as storing the EHR, adding the emergency entity and/or emergency response teams (such as ambulance personnel) to the list of organizations and people who can gain access to the EHR information, exchanging security credentials with the emergency entity, and providing his/her mobile device with the above elements to include the encrypted medical identifier in the emergency message during an emergency call. Advantageously, making such provisions in advance enables taking into account privacy considerations, while using the dedicated encrypted medical identifier avoids possible misuse.

The network may provide a location service for determining respective locations of respective mobile devices in the regional area. Also, the network may be arranged to enable transfer of a request message to a respective mobile device, the request message requesting to include an encrypted medical identifier of a user of the respective mobile device in an emergency message.

In an embodiment, the emergency entity may be arranged to, in the event of an emergency call being made by a second mobile device other than the mobile device of the user who may be a victim of the emergency, locate at least one mobile device in the vicinity of the second mobile device via the location service; and generate the request message for the located mobile device. The emergency entity may now determine which mobile device likely is the mobile device of a victim of the emergency, e.g. the device closest to the second mobile device. The caller at the second mobile device may assist in determining which mobile device belongs to the victim, e.g. by moving said second mobile device towards the victim. The emergency entity may instruct the person who calls to move to or stay in very close proximity of the victim (or his/her phone).

In an embodiment of the mobile device the secure processor is arranged, for establishing that the user may be a victim of the emergency, to receive the request message. Upon receiving such a message, the mobile device establishes that the user may be a victim of the emergency, and includes the encrypted medical identifier in the emergency message. Advantageously, even in the event that the person who calls is not the victim, it is possible to automatically retrieve the EHR identification data from the victim's phone.

In an embodiment, wherein the mobile device is arranged to perform a distance measurement between the mobile device and a further mobile device, the secure processor is arranged, in the event of an emergency, to enable a distance measurement and to transfer the measured distance to the network for determining enhanced location data of the mobile device. For example, the location service and/or the emergency entity and/or a second device making the emergency call may be arranged to generate at least one distance measurement message. Such distance measurement message requests to perform at least one distance measurement between the mobile device and at least one further mobile device located in the vicinity and to transfer the at least one measured distance to the location service and/or emergency entity for determining enhanced location data of the mobile device. Thereto the secure processor may be arranged to receive the distance measurement message and to enable said distance measurement. Advantageously, the location of the mobile device of the victim may be determined with an enhanced accuracy due to the at least one measured distance to other located devices. The enhanced location data may be forwarded to said responders to improve locating the victim.

In an embodiment, a network entity to be arranged in a mobile network is arranged to receive identity data from a mobile device engaging an emergency call setup, to obtain an encrypted medical identifier corresponding to the identity data; and to include the encrypted medical identifier in the emergency message during an emergency call. The emergency message including the encrypted medical identifier is transferred to the emergency entity. For example, the IMEI may be used as identity data and may be linked to the encrypted medical identifier, e.g. by the user registering his devices through some kind of registration service offered by the mobile operator and linking it to the encrypted medical identifier.

The methods according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc.

The computer program product in a non-transient form may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is also provided a computer program product in a transient form downloadable from a network and/or stored in a volatile computer-readable memory and/or microprocessor-executable medium, the product comprising program code instructions for implementing a method as described above when executed on a computer.

Another aspect of the invention provides a method of making the computer program in a transient form available for downloading. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF EMBODIMENTS

Figure 1:
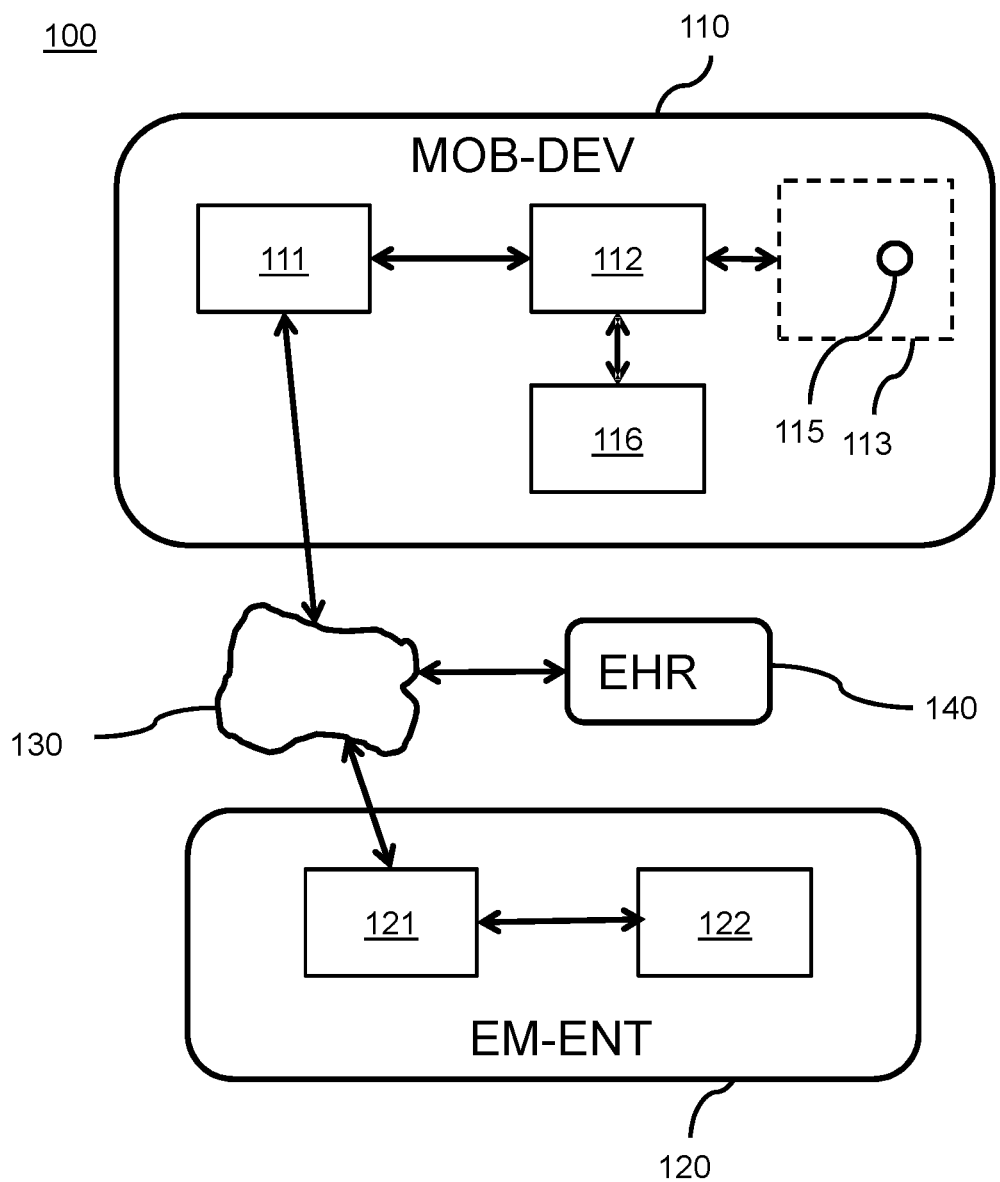
FIG. 1 shows a mobile device and an emergency entity and a network for wireless communication.

FIG. 1 shows a mobile device and an emergency entity and a network for wireless communication. In a communication system 100, a mobile device 110 is arranged for wireless communication in a mobile network 130 according to a network communication protocol. The mobile device may, for example, be a mobile phone, a wearable medical device or a data communication unit embedded in a car. In the communication system, a subscriber identity, SI, comprises subscriber identity data of a subscriber to access a core network, the mobile network providing wireless communication for mobile devices across at least a regional area. As elucidated in the introduction, the mobile network may be a 3G, LTE, 4G or 5G cellular core network. FIG. 1 schematically shows the network 130 for providing a communication channel between the emergency entity EM-ENT 120 and the mobile device MOB-DEV 110. The core network is managed by at least one telecom provider, e.g. for managing a subscriber database and invoicing. The network is also coupled to a medical database EHR 140, e.g. provided on a separate server on the Internet, or provided by a healthcare organization or emergency entity, and coupled wirelessly and/or wired, or via a dedicated link, to the network.

The mobile device 110 is arranged for wireless communication with the network, and has a transceiver 111 arranged for the wireless communication, and a processor 112 arranged to control the communication and provide an interface to the user. The mobile device may be provided with a subscriber identity module, SIM, and may also be provided with a user interface 113, e.g. including a display and one or more user input elements 115. For example, the user input elements may comprise one or more of a touch screen, various buttons, a mouse or touch pad, etc. Buttons may be traditional physical buttons, touch sensors, or virtual buttons, e.g. on a touch screen or icons to be activated via a mouse. The user interface may also be a remote user interface.

The emergency entity 120 has a secure processor 122 arranged to execute emergency operations as elucidated below, and a network communication unit 121 arranged for communication with the network, either wireless or via a wired link.

The medical database 140 contains respective electronic health records (EHR) regarding respective persons, each person having a respective medical identifier linking the person to the respective electronic health records. The network is coupled to the medical database.

The network communication protocol enables calls between subscribers to the network, which calls comprise emergency calls between mobile devices and the emergency entity 120. An emergency call setup is initiated upon a mobile device performing an emergency action.

The secure processor 122 in the emergency entity is arranged to retrieve the encrypted medical identifier from the emergency message. Upon retrieving the encrypted medical identifier, the secure processor proceeds to access the medical database to retrieve at least one electronic health record (EHR) based on the encrypted medical identifier for enabling forwarding information from the electronic health record (EHR) to responders to the emergency. Selection of responders for the emergency response may happen automatically based on the situation of the responder e.g. location, expertise, readiness, preference, etc, which are derived from the corresponding information retrieved from the mobile device of the responder. The forwarding of the HER data may be automatically routed to mobile devices of responders to the emergency such as an ambulance. Also, the selection of responders and forwarding of the EHR information may be performed by a human operator present at the emergency entity, e.g. by calling the medical staff on the ambulance.

The secure processor 116 in the mobile device is arranged to obtain the encrypted medical identifier of a user of the device, and also, upon establishing that the user may be a victim of the emergency, to include the encrypted medical identifier in the emergency message during an emergency call. Various practical embodiments are elucidated below.

In a practical embodiment of the system, a device A, being a mobile device, sends an encrypted identifier X, different from SIM card own unique identifier (i.e. International Mobile Subscriber Identity (IMSI), Subscription Permanent Identifier (SUPI), Temporary Mobile Subscriber Identity (TMSI) or Globally Unique Temporary User Equipment Identity (GUTI)), as part of a cellular emergency communication session setup with a destination device B constituting an emergency entity. Device B is communicatively coupled with a database of patient health records, either directly or through a device C. Either device B or device C decrypts the received encrypted identifier X resulting in decrypted identifier Y. The decrypted identifier Y is used to retrieve a set of patient health records associated with identifier Y.

In a further practical embodiment, a second mobile device D makes the emergency call, while not being the victim's mobile device. In such a situation the system with devices A, B and C is the same as above. So, second mobile device D sets up a cellular emergency communication session with a destination device B, the emergency entity. Device B is communicatively coupled to a location service S operating in the mobile operator's core network. Location service S is able to determine which mobile device is closest to the device making the phone call. Device B requests service S to determine a mobile device A that is closest to the device making the phone call, and upon the determination of mobile device A and subsequently issues a request for device A to send the encrypted identifier X as part of a cellular emergency communication session setup to device B. Alternatively or additionally, a further communication session with a service T or device D may be used which in turn forwards the encrypted identifier X to device B. Device B receives and processes the encrypted identifier X as described above.

In an embodiment, the secure processor is arranged, for establishing that the user may be a victim of the emergency, to perform one or more of the following options. Optionally, the secure processor may determine that the emergency call is being made via the network communication unit, e.g. by detecting that a regional emergency number is called or receiving data from the processor 112 of the mobile device that an emergency call is set up.

Optionally, the secure processor could detect one of the situations as described below to establish that the user may be a victim of the emergency, and if not possible to detect automatically some additional checks or procedures may be required by the emergency entity, which may be different (e.g. asking different questions or asking the user to perform certain action on the device) depending on whether the device by which the emergency call has been made supports the capability of including a medical identifier or not. To this end, a message, or an attribute/flag as part of a message may be sent to the emergency entity through the emergency communication that indicates that the device supports the capability of including a medical identifier and possibly sensor information or other information about which situations the device was not able to detect.

Optionally, a victim's phone could broadcast some message (e.g. via Wi-Fi) that it is the victim's phone, after it detects any of the below situations. If another device makes the phone call to the emergency number, the another device may start listening to these messages (e.g. via Wi-Fi) from other phones in vicinity, and use this to determine if the user of the another device is victim of an emergency or someone else in the vicinity.

Optionally, the secure processor may detect an acceleration of deceleration above a predetermined limit, e.g. to detect an accident in a car or the user falling or being hit. Also, if a fall is detected by the mobile device just before calling the emergency number, then the user of that mobile device is likely to be a victim, and hence the mobile device may automatically include the encrypted medical identifier. Also, if an automatic emergency call (eCall) is made from a car that was just involved in an accident, then a mobile unit in the car may automatically include the encrypted medical identifier of the driver. Also, the car control system may be arranged to determine who is the driver and possibly also other passengers, and include one or more encrypted medical identifiers.

Optionally, the secure processor may detect aberrations in sensors of vital signs of the user. Vital signs sensors on mobile device can detect major health issues (e.g. a heart attack). Typically, this may generate an alarm or warning condition. So, if that happens before calling the emergency, then the mobile device may automatically include the encrypted medical identifier. So, optionally, the secure processor may detect an alarm condition as generated by a further processor in the mobile device or an external source. The external source may be a car.

Optionally, the secure processor may receive user input regarding the emergency. For example, the UI on mobile device may show a question whether the user is victim of an emergency, or regarding the nature of the emergency. For example, a question may be whether or not the caller or bystander are victim. Also, the mobile device may have voice recognition, for example distinguishing the caller saying "I had an accident" or "I saw an accident". Based on the outcome the secure processor may automatically include the encrypted identifier or not. Also, the mobile device may have some pre-configured set of rules (e.g. set by user). A rule may, for example, be to only include encrypted identifier when calling emergency number if user did not press "do not include identifier" button within 10 seconds after initiating the call.

Optionally, the secure processor may receive user input regarding including the encrypted medical identifier in the emergency message. For example, the user may instruct so or confirm to transfer medical data to the emergency entity, e.g. the device may show questions whether or not the caller wants to include the encrypted medical identifier. Also, the mobile device may tell the user through voice communication to press a key (e.g. press "1") to include the encrypted medical identifier. Optionally, the user may give generic "user consent", i.e. the user may agree to always include the encrypted medical identifier, not only when it is the victim of an emergency.

Optionally, the secure processor may be arranged to receive a message from the emergency entity. Such message may request to enter additional data regarding the emergency or the victim. Optionally, the emergency entity may send a special message whether to include or not include the encrypted medical identifier within e.g. 20 seconds. The mobile device may be arranged to wait until it receives this message before it sends the encrypted medical identifier. To this end the emergency dispatcher may upon assessing the situation with respect to the caller and victim, press a different button on the screen, after which the respective special message is sent. The special message may include a different authentication credential based on whether the caller is the victim or not, which can be used as a trigger to send the encrypted medical identifier or not.

Optionally, the secure processor may receive a message from the network that no other mobile phones are within a spectator range. For example, the network could detect that no-one else but the caller is present within 100 meters. If so, then the caller is likely to be victim, and hence the identifier needs to be included, which may be communicated to the mobile device. Upon establishing the user of the mobile device is the victim, the mobile device may automatically turn on an accurate location service, e.g. GPS, on the mobile device or on another mobile device in proximity of the user, e.g. the GPS of the mobile device in the user's car, to identify the accurate location of the user and automatically include the location information of the user in the emergency call. Optionally other location services on the mobile device that can aid in accurately locating the user e.g. Wi-Fi assisted GPS could be turned-on and used automatically for identifying the user's accurate location e.g. less than 10 meters.

The network may provide a location service for determining respective locations of respective mobile devices in the regional area. Also, the network may be arranged to enable transfer of a request message to a respective mobile device, the request message requesting to include an encrypted medical identifier of a user of the respective mobile device in an emergency message.

In an embodiment wherein the mobile device 110 is arranged to perform a distance measurement between the mobile device and a further mobile device; and the secure processor 116 is arranged, in the event of an emergency, to enable a distance measurement and to transfer the measured distance to the network for determining enhanced location data of the mobile device. By receiving one or more distance measurements between the mobile device and further located devices, the location service and/or the emergency entity are enabled to enhance the accuracy of the location data of the mobile device. In practice, the location data based on receiving the transmissions from mobile devices are not very accurate, e.g. having a tolerance of 100 m. On the contrary, local distance measurements are much more accurate, e.g. having a tolerance of 1 m. Combining multiple locations of multiple mobile devices with the distances between such located devices may increase the accuracy of the location data.

In a practical embodiment of the system, a device A sets up an emergency call with emergency entity B. Device B is communicatively is coupled to a service or function T operating in the mobile operator's core network. Service T is able to determine a set of mobile devices $\{D0, \ldots, Dn\}$ that are located in the vicinity of device A and that are capable of performing wireless distance measurement and/or angle estimations. Service T sends a message Mx ($0 \leq x \leq n$) to each of the mobile devices Dx of the set of mobile devices $\{D0, \ldots, Dn\}$, message Mx containing instructions and optionally also authorization credentials to participate in performing distance measurement with mobile device A, and further sending a message N to mobile device A containing instructions and optionally also authorization credentials to participate in distance measurement with mobile devices $\{D0, \ldots, Dn\}$. Mobile device A and mobile devices $\{D0, \ldots, Dn\}$ subsequently perform distance measurements and/or angle estimations, and send the results of the distance and/or angle measurements to service T. Service T (or some other function in the core network to which T is communicatively coupled or device A) may use the received distance and/or angle measurements for improved location estimation of device A, and inserting the improved location estimation as part of the cellular emergency communication session setup with the emergency entity.

In an embodiment, the secure processor 116 in the mobile device is arranged, for obtaining the encrypted medical identifier, to perform one or more of the following options.

Optionally, the secure processor is arranged to encrypt medical identifier data based on key data during the emergency call. The key data may be stored in a secure storage memory in the device, e.g. in the SIM.

Optionally, the secure processor is arranged to receive authentication data for verifying that a trusted party requests sending the encrypted identifier. For example, the emergency entity may first send its authentication data to the mobile device.

Optionally, the secure processor is arranged to retrieve medical identifier data or the encrypted medical identifier from a remote server accessible to the secure processor via the network communication unit. For example, the subscriber may have stored the medical identifier data or the encrypted medical identifier on a HSS in advance in case of an emergency.

In an embodiment, the secure processor in the mobile device is arranged, for obtaining the encrypted medical identifier, to re-encrypt the medical identifier data after the encrypted medical identifier has been used as part of an emergency call or after a predetermined period. Such re-encrypting avoids that malicious parties reuse the initial encrypted medical identifier.

In an embodiment, the emergency entity may be arranged to, in the event of an emergency call being made by a second mobile device other than the mobile device of the user who may be a victim of the emergency, locate at least one mobile device in the vicinity of the second mobile device via the location service; and generate the request message for the located mobile device. The emergency entity may now determine which mobile device likely is the mobile device of a victim of the emergency, e.g. the device closest to the second mobile device. The caller at the second mobile device may assist in determining which mobile device belongs to the victim, e.g. by moving said second mobile device towards the victim. The emergency entity may instruct the person who calls to move to or stay in very close proximity of the victim (or his/her phone). Optionally, the secure processor in the emergency entity may be arranged to select said one of the at least one located mobile device based on the location of the selected mobile device being closest to the second mobile device. Also, the secure processor in the emergency entity may be arranged to select said one of the at least one located mobile device based on the locations of multiple located mobile devices constituting a spectator pattern around the selected mobile device.

In an embodiment, the secure processor 122 in the emergency entity may be arranged to select said one of the at least one located mobile device based on requesting the operator of the second mobile device to move the second mobile device close to the mobile device of the victim while other mobiles devices are further away. Also, the secure processor 122 in the emergency entity may be arranged to sending a call setup request to the selected mobile device for generating a call signal emanating from the selected mobile device for enabling the operator of the second mobile phone to confirm that the selected mobile phone is at the victim.

In an embodiment, the secure processor 122 in the emergency entity is arranged to select said one of the at least one located mobile device based on sending biometric property data to the second mobile phone for enabling the operator of the second mobile phone to confirm that the biometric data corresponds to the victim having the selected mobile phone. Also, the secure processor 122 in the emergency entity may be arranged to request the operator of the second mobile phone to obtain biometric property data of the victim for transferring the obtained property data to the emergency entity.

For example, if the person who calls via the second mobile device is not the victim, then in spite of using one or more positioning mechanisms to determine the closest device in range to be the victim, still an extra check may be needed to determine if the correct person's EHR information is being addressed. Of course if the person is conscious checking the person's name with the person's name as part of the patient's EHR information would be sufficient. If the person is unconscious, the extra check could comprise of sending information about physical features based on the patient's EHR information, such as gender, age, hair color, eye color, size, weight, and possibly also a picture stored as part of the patient's EHR to the second mobile device. Now, the caller or a first responder arriving at the scene may use the information/picture received to determine whether or not the victim is indeed the person corresponding to the information/picture. Alternatively, the person that calls could send a picture of the victim and/or bystanders to the emergency entity to check if the picture in the EHR corresponds to the victim. So, the picture is sent to dispatcher at the emergency entity and dispatcher does the identification. Alternatively, if the person is unconscious, the caller or a first responder arriving at the scene could be asked to verify the fingerprint of the victim by putting the victim's finger on a fingerprint scanner (e.g. using an app on the first responder's phone), after which the fingerprint is cross checked with a fingerprint stored as part of the EHR to check if the fingerprint indeed corresponds to the victim. As yet another alternative, the caller or a first responder could be instructed to find other information at the scene (e.g. by checking the victim's wallet) to identify the victim and see if the name matches the patient's name in the EHR information. As yet another alternative, the closest device in vicinity will issue an alert (e.g. starts making a particular noise or display a message) that the device is about to make a call to the emergency entity including the encrypted identifier X to access the corresponding EHR information.

Figure 2:
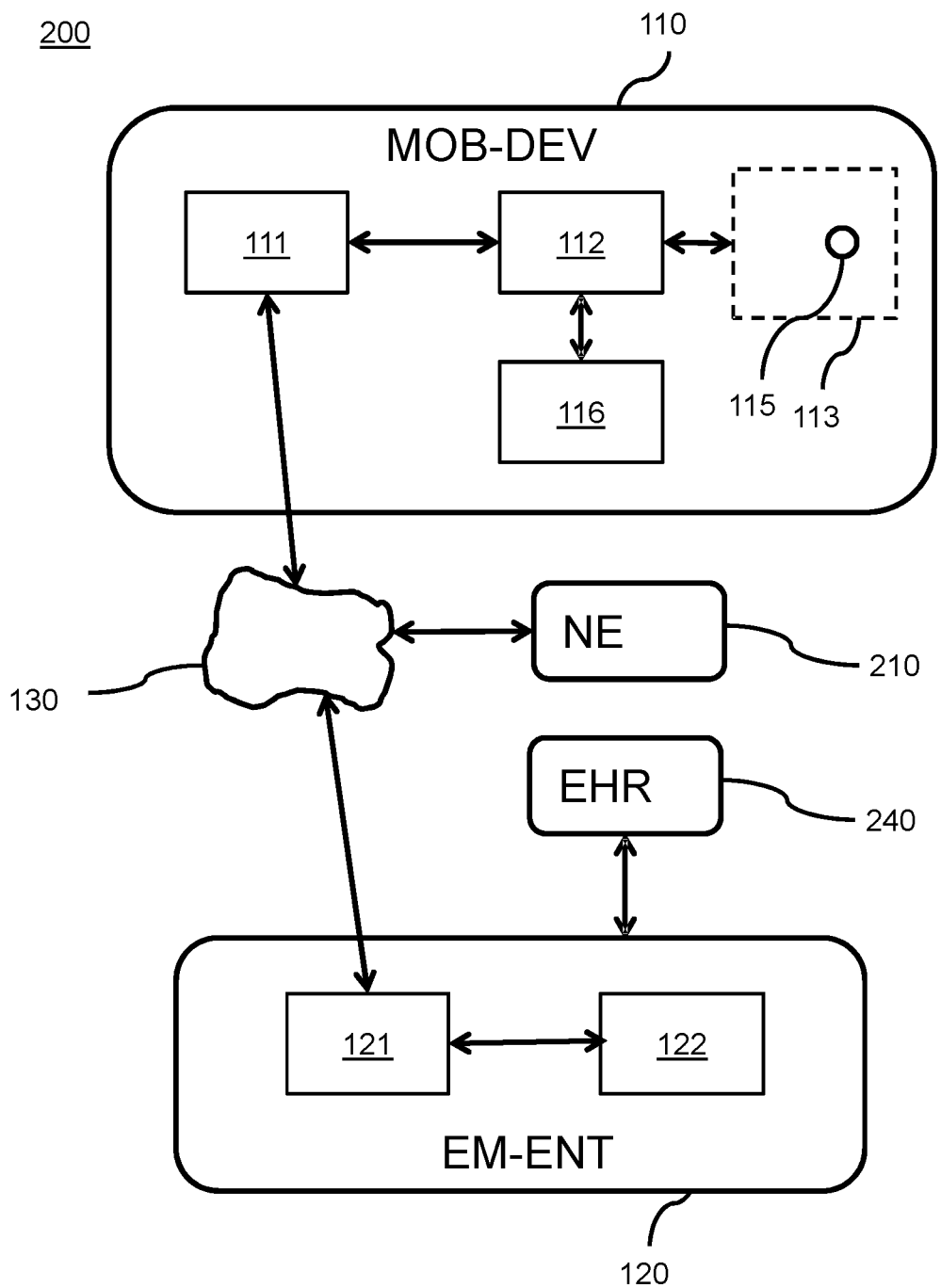
FIG. 2 shows an example of a system having a mobile device, a network entity, an emergency entity and a network for wireless communication.

FIG. 2 shows an example of a system having a mobile device, a network entity, an emergency entity and a network for wireless communication. In a communication system 200, the mobile device MOB-DEV 110, the mobile network 130 and the emergency entity EM-ENT 120 are as described above with reference to FIG. 1. The medical database EHR 240 is similar to medical database 140 in FIG. 1, but is now directly coupled to the emergency entity. Alternatively, the medical database may be accessed via another network, e.g. via a local network coupled to the emergency entity or via a further device coupled to the emergency entity.

FIG. 2 also shows a network entity 210 coupled to the network. The network entity is arranged to receive identity data from a mobile device engaging an emergency call setup. Subsequently, the network entity is arranged to obtain an encrypted medical identifier corresponding to the identity data, and to include the encrypted medical identifier in the emergency message during an emergency call. For example, the network entity may retrieve the encrypted medical identifier from an HSS (Home Subscriber Server; not shown as such), as further described below. A subscriber may have stored the medical identifier data or the encrypted medical identifier on the HSS in advance in case of an emergency.

In the following section a system for providing information from the electronic health record (EHR) to responders to an emergency, is discussed consisting of the following devices:

Device A is mobile device operated by the victim. This is likely to be a mobile phone, but could also be a vital signs monitoring device, telemetry/ECG monitoring device, smartwatch, fall detector or other type of portable device. Alternatively, device A could be a cellular networking unit inside a vehicle being able to make an emergency call (eCall) after the car is involved in an accident.

Device B is a phone, laptop or server device in the emergency entity that is being operated by an emergency medical dispatcher to receive and handle the particular emergency call from device A.

Device C is an optional other device (e.g. a computer used by the emergency medical dispatcher, or a gateway or server device) to which device B is connected and that provides access to the database with the relevant patient health data.

In an embodiment, device A has some local non-volatile storage that is secure and protected from general access by the general application processor, for example smart Micro-SD storage, or secure storage inside the mobile device's SIM or eSIM (also known as UICC and eUICC respectively) or part of a secure element in the device. Typically, these types of secure storage solutions are capable of hosting a set of applications and services in one or more security domains (e.g. as specified in GlobalPlatform Card Specification v2.2). For mobile devices it is very common to be equipped with an (e)SIM to be able to access the cellular network. As specified in ETSI TS 102.221 and 3GPP TS 31.101, the (e)SIM's secure storage is structured according to a particular file structure and can be accessed using a standardized set of interface commands. An (e)SIM is typically also equipped with its own security processor, capable of encryption/decryption and other types of security functions.

Device B or device C is associated with a database containing Electronic Health Records. Given that such database typically contains health records for many different people, a person specific identifier is needed to access the record of a particular person. For security purposes, these records are protected with one or more passwords or security credentials. In one embodiment, an application (e.g. web site) associated with the database generates an identifier Y and a corresponding security credential S to allow access to the person's Electronic Health Record in case of an emergency. In one embodiment, the identifier Y and security credential S can be used to gain access to all information stored as part of the EHR. In another embodiment, the identifier and the corresponding credentials can only be used to access a subset of the EHR information for emergency access, and not have full access to all the data in the EHR.

In a further embodiment, the identifier Y and credential S are encrypted with an encryption key T, thereby generating encrypted identifier X and encrypted credential S'. In an embodiment, the mechanism as described in U.S. Pat. No. 8,627,103 is used for encryption and decryption, whereby a healthcare provider only gets access to data decryption key (e.g. credential S as mentioned above) after it has been provided to him by an emergency agent. The resulting encrypted identifier X and encrypted credential S' are stored in device B or C or in a secure database which can be accessed by device B or C. Device B or C also have access to a decryption key associated with encryption key T.

In an embodiment, the encrypted identifier X and optionally also the encrypted credential S' are provided to the Mobile Network Operator (MNO) to which the person to which the EHR data belongs is subscribed, and are subsequently stored by the MNO on the SIM that is sent to the person, or is remotely provisioned by the MNO as part of the MNO's eUICC profile that gets downloaded to the eSIM of the person's mobile device A, or that is securely transmitted over the air by the MNO using a proprietary interface. The encrypted identifier X is preferably stored as an elementary file that can be read by the USIM application running on the (e)SIM, as specified in 3GPP TS 31.102. Similarly, for the encrypted credential S'. In an alternative embodiment, encrypted identifier X and optionally also the encrypted credential S' are stored by another application running on the (e)SIM as part of the SIM toolkit within the same security domain as the USIM application, e.g. as specified in 3GPP TS 31.111. For example, the another application could be an application capable of reading a dynamic QR code containing encrypted identifier X, the QR code being generated by a web interface to the EHR database. This can be done in a similar way for the encrypted credential S'.

In another embodiment, encrypted identifier X is stored as an elementary file in a (e)UICC under a non-network security domain (e.g. ECASD) rather than the security domain of the MNO that is used to connect to a mobile network. An interfacing application on the (e)UICC will access the encrypted identifier X through a secure channel established between the security domains using a set of access rules (e.g. as specified in Globalplatform Card Specifications v2.3.1) and will ensure that no network related information (e.g. IMSI, PLMN) are accessible between the security domains (network access) (e.g. as specified in Applet Isolation and Object sharing in Java Card 2.2x Runtime Environment). This can be done in a similar way for the encrypted credential S'.

In another embodiment the encrypted identifier X stored as an elementary file in a security domain of MNO.X rather than the security domain of the MNO.Y, which is used to connect to a mobile network (e.g. Dual SIM devices, where one of the SIM cards has the encrypted identifier X and the other does not). An interfacing application on the (e)UICC will access the encrypted identifier X through a secure channel established using a set of access rules between different security domains (network access) and will ensure that no network related information (e.g. IMSI, PLMN) are accessible between the security domains (network access). This can be done in a similar way for the encrypted credential S'.

In an alternative embodiment the encrypted identifier X is stored as an elementary file in a secure element under a different root of trust than that of an (e)UICC. Upon initiating an emergency call, the interfacing application on the (e)UICC will access the encrypted identifier X using secure parameters (e.g. PIN code) of the security domain (no network access) stored in the secure element under a different root of trust than that of the (e)UICC. (e.g. PIN code of the secure element provided by the owner of the device A during the initial set-up). This can be done in a similar way for the encrypted credential S'.

In another embodiment, the encrypted identifier X is stored as an elementary file in a security domain of the (e)UICC itself, which is not yet provisioned with a MNO profile to connect to a mobile network (e.g. a blank (e)UICC). An interfacing application on the (e)UICC will access the encrypted identifier X stored under the security domain of the (e)UICC and transmit it across the network. (e.g. equivalent to that of an emergency call made without a mobile subscription). This can be done in a similar way for the encrypted credential S'.

In another embodiment, device A has an NFC interface, and the encrypted identifier X and optionally also the encrypted credential S' are transferred from a device W using an NFC communication channel to device A, thereby using the NFC functionality of the (e)UICC (e.g. as specified in RSP architecture V2.2) for storing the encrypted identifier X and optionally also the encrypted credential S' on the (e)UICC either under the MNO security domain or in a security domain hierarchy with an authorized management privilege. It should be required that the interfacing application on the (e)UICC ensures the NFC application, which stores the encrypted identifier X and optionally also the encrypted credential S' under a specific security domain, is trusted and authorized to modify the contents under a specific security domain on the (e)UICC (e.g. based on the certificate authority of the security domain).

In an embodiment a cellular networking unit inside a vehicle is able to make an eCall in the event that the car is involved in an accident. The cellular networking unit may be equipped with multiple identifiers, e.g. of all the family members that make use of the car. When the cellular unit of the car makes an eCall to the emergency entity, multiple encrypted identifiers may be sent to the emergency entity as part of the eCall simultaneously, since multiple family members may be involved in the car accident. Alternatively, once the eCall has been received by the emergency entity, the location of the car making the eCall is matched with the location of one or more mobile devices (e.g. mobile phones carried by the one or more persons in the car) in closest vicinity of the car. If the location matches within a small error margin (e.g. 2 meters), then the mobile device(s) for which the location matches the location of the car are considered to be owned by the victim(s). Alternatively, the emergency center could find out, through a service provided by the MNO, the phone number of a mobile device in very close vicinity and make a call to confirm what has happened and how many victims are there.

In a further embodiment, device A makes an emergency call using GSM/CSMA/HSDP/LTE/5G NR to the emergency entity which gets routed/forwarded in the emergency entity to device B. Emergency calls are typically calls made to national emergency numbers such as 112 in Europe and 911 in the United States. Basically, national emergency phone numbers are stored and recognized by the mobile device, upon which the mobile device and network can initiate special protocol actions related to the emergency call. MNOs have specific mechanisms in place to handle calls in case of emergencies, e.g. as specified in 3GPP TS 23.401 section 4.3.12 for 4G and 3GPP TS 23.501 section 5.16.4 for 5G, and specified in general in 3GPP TS 22.101 section 10). In this document, emergency calls are not restricted only to calls to national emergency numbers, but could be other types of calls e.g. to the hospital, for which fast access to vital patient health information is important and could be identified as such. This could be achieved e.g. by providing the MNO a specific set of phone numbers to which the encrypted identifier X should be sent if a call is made to one of those phone numbers, or by having an additional authentication/authorization step as part of the phone call (e.g. only send the encrypted identifier X if the receiving party can authorize itself to the MNO or the source device, or if the source device provides the credential to access a particular (private) network slice operated for example by a hospital, or e.g. by providing the necessary credentials via an applications (i.e. Application Function (AF) in 3GPP TS 23.501) connected via a secure API to the Network Exposure Function and/or Policy Control Function (i.e. NEF and PCF as specified in 3GPP TS 23.501, or through the lawful interception framework (e.g. as specified in 3GPP TS 33.106).

In a further embodiment, encrypted identifier X gets sent as a separate message or an attribute or information element/subfield inside an existing message as part of the emergency communication session setup. The identifier could be inserted as part of the call setup procedure in the USIM application. If Session Initiation Protocol (SIP) is used for call setup, then this could for example be done by using a field inside the SIP Invite or SIP register message to the emergency service (as specified in 3GPP TS 23.167). The identifier could also be added as an extra URI parameter in the emergency SIP address used as destination for the SIP Invite/Register message. Alternatively, the identifier could be added as an additional message or as part of the additional data field in an eCall MSD message (as specified in 3GPP TS 26.267) In case PLMN circuit switched network is used for call setup, then this could be added for example to the fields inside the attributes included in emergency calls as specified 3GPP TS 22.003 Section A.1.2.

In a further embodiment, the credential S or the encrypted credential S' are also stored on device A's secure storage, and get sent along with the encrypted identifier X as part of the emergency communication session.

In an alternative embodiment, encrypted identifier X gets sent to the Mobility Management Entity (MME), Access Mobility Function (AMF) or Packet Data Network PDN Gateway for example as part of the fields/attributes of a NAS Attach Request or NAS Attach Accept message, and/or PDN Connectivity Request to an emergency bearer. The respective MME/AMF, PDN Gateway forwards the identifier X to the emergency entity (e.g. as part of a SIP message of the IMS connection setup or a message as part of the Circuit Switched network connection setup).

In another alternative embodiment, encrypted identifier X is not stored on device A itself, but in the core network, e.g. as part of the Home Subscriber Server (HSS, as specified in TS 23.002) or a generic 5G user identity service provided by the network operator. Once device A registers itself to the network, the MME fetches the information from the HSS and passes it along during the connection setup with the emergency entity (e.g. as part of a SIP message of the IMS connection setup or a message as part of the Circuit Switched network connection setup). This can of course be used only in case the SIM is properly registered to the core network (i.e. is valid UE as per 3GPP TS 23.401 section 4.3.12). Also, if in case of emergency the device is not fully registered to the network, the network could still offer a service where users have previously linked their device's IMEI or other identity to the encrypted identifier to access EHR data.

In another alternative embodiment, the non-encrypted identifier Y is stored on the device A's secure storage. The identifier Y gets encrypted using a credential securely stored on the mobile phone itself (e.g. a credential that is part of the MNO's security domain or a credential part of a separate security domain) using the security processor in device A's (e)SIM. This should of course be used only in case the SIM is properly registered to the core network and the NAS and AS security contexts are in place (i.e. is valid UE as per 3GPP TS 23.401 section 4.3.12). Alternatively, a separate IPSec or HTTPS communication channel could be set up (e.g. using a pre-shared key or using a public key from a X.509 certificate received from the emergency entity and signed by a trusted certificate authority. Otherwise, the encryption would not occur and identifier Y would be sent in the clear, which could make it vulnerable for security hacks.

A user could give permission to include the encrypted identifier X in every emergency call, and/or provide some policy information (e.g. stored in the PCF) as to which situations and/or which phone numbers the encrypted identifier X is allowed to be sent as part of the emergency call, e.g. through an application on the mobile device (e.g. running as part of the SIM Toolkit environment) or through a website of the MNO. The logic when to include the encrypted identifier X could also be programmed as part of the USIM application.

For extra security, device A may send the encrypted identifier X to device B only if device A (or a core network function such as MME) is provided with a special credential (e.g. emergency credential sent by device B to device A as part of a X.509 certificate signed by a particular certificate authority) for which the authenticity can be verified by device A (or a core network function such as MME) before sending the encrypted identifier X. This could be part of the procedure as mentioned above where the mobile device is arranged to wait for a special message (which may include such an emergency credential) before it sends the encrypted medical identifier. Furthermore, for extra security the encrypted identifier X should get re-encrypted with a fresh hash or credential after being used as part of the emergency call (or after certain pre-defined time). Optionally, for extra security, the encrypted identifier X may be sent over a separate IPSec or HTTPS protected communication channel between device A and device B.

In a further embodiment the system consists of the following devices. Device A, B and C being the same as above, while device D is mobile device that is used to make an emergency call, but which is operated by a bystander or family member of the victim, not the victim itself. It may also be a first responder that just arrived at the scene. This is typically a mobile phone.

In one embodiment, the person that calls or the first responder can be asked to take the mobile phone of the victim to make an emergency call, so that the encrypted identifier X gets sent to the emergency entity for access to the EHR information. This scenario is further covered above.

In another embodiment, the emergency entity (e.g. device B) receives the location of the device D making the emergency call, as generally provided during emergency calls (e.g. as specified in TS 23.167 Section 7.6), since this is mandatory legislative requirement in many countries, such as the FCC's E911 mandate (see https://www.fcc.gov/general/9-1-1-and-e9-1-1-services). After receiving the location of device D, device B may request service S to provide information about the closest mobile device in vicinity of device D making the emergency call. To this end device B can send the received location information to service S or service S requests this information from a location service/entity in the core network (e.g. GMLC or E-SMLC, see e.g. https://www.cisco.com/c/en/us/td/docs/wireless/asr_5000/20/MME/b_20_MME_Admin/b_20_MME_Admin_chapter_011110.pdf). To this end service S may issue a request to the eNB to which device D is connected, that the eNB measures the location of all mobile devices connected to the eNB (e.g. through the LTE Positioning Protocol (LPP), Mobile Location Protocol (MLP) and/or Secure User Plane Location (SUPL)), after which the distance between the mobile devices and device D's position is estimated, upon which the device with the closest estimated distance is selected. Additional context information could be used, e.g. by detecting a group forming around the victim, e.g. in the shape of circle. The victim's phone likely to be located in the center of the circle.

In an embodiment of the system, in order to further reduce the response time, the emergency entity may select the closest first responder before dispatching. Here, the term first responder is used in the sense of a medical professional who gives the first aid at an emergency situation. Such professionals usually are the ones to whom the EHR data are dispatched by emergency entity. However, the word "responder" mentioned in this document may also refer to a person who is already at the scene of the accident, e.g. a caller who is no victim, but who is able to provide first aid.

Upon establishing that user of the device A is the victim and deriving the medical and location information of the victim, device B may search for responders in the vicinity of the victim based on the information derived from the mobile device of the first responders. In this embodiment, mobile device of the responders must share the location information to the device B of the emergency entity. In addition, first responders shall provide additional information about their readiness at a given time e.g. engaged with emergency situation or available for new requests to the device B of the emergency entity. Also, the level of expertise of the first responder in handling a particular medical condition may be updated regularly and shall be provided to the device B of the emergency entity. In this embodiment Device B of the emergency entity shall be able to automatically choose the appropriate first responder based on the information obtained from the first responders in real time. Upon choosing the first responder, device B of the emergency entity shall confirm the acceptance of the emergency request with the first responder. On accepting the emergency request, device B shall share the location and medical information of the victim to the first responder.

In an embodiment of the system, in order to better detect the distance between device D and device A, a special mode could be requested on device A or D to measure the distance between A and D, for example by using Wi-Fi fine-time measurement as specified in IEEE 802.11-2016, or by the MNO authorizing LTE ProSe function (as specified in 3GPP TS 23.303 and TS 24.334) on both device A and D so that they can discover each other using LTE sidelink D2D communication channel and perform distance measurement or proximity detection, e.g. through PC5 or Wi-Fi Aware ranging. Alternatively, NFC or Qi could be used, e.g. by letting an emergency medical dispatcher in the 911/112 emergency entity instruct the person that calls or the first responder to fetch the victim's phone and hold it very close to his own phone to make sure the device in closest vicinity is addressed. The NFC or Qi communication channel could be used to send a message to device A to trigger it to send the encrypted identifier X. Such message could incorporate a special credential (e.g. emergency credential as part of a X.509 certificate signed by a trusted certificate authority) for which the authenticity can be verified by device A before sending the encrypted identifier X. To be more specific, the NFC functionality of the (e)UICC (e.g. as specified in RSP architecture V2.2) of the device A may be used to transmit (e.g. PUSH) the encrypted identifier X to the NFC enabled (e)UICC of the device Q of the first responder. An interfacing application on the (e)UICC of the device A will ensure that no network related information (e.g. IMSI, PLMN) are accessible to the application of the NFC enabled (e)UICC of the device Q through the NFC channel. Device Q, Device B or device C will decrypt the identifier X resulting in the decrypted identifier Y, and subsequently use the decrypted identifier Y to retrieve a set of patient health records associated with identifier Y.

In a further embodiment, the distance information and/or information about which device is in closest vicinity to device D is communicated via service S or device D to device B. Upon receiving this information and determining that device A is the closest device in vicinity to device D, device B can issue a request (e.g. via service S or other core network service) indicating to device A to send the encrypted identifier X to device B. To this end, service S may send a paging message to device A with this special request (which may be encrypted with a special emergency credential and which contain a destination IP address or call destination information). Upon receiving the special request, device A may send encrypted identifier X as part of an emergency call to device B. Alternatively, device A may send encrypted identifier X to service S or other core network service (e.g. as part of an RRC message or (emergency) call setup message or as a user plane message to a certain destination IP address), upon which service S or the other core network service forwards the encrypted identifier X to device B.

In an alternative embodiment, device B issues the special request to device A via device D, upon which D forwards the request via an LTE sidelink D2D communication channel or NFC/Qi communication channel to device A, upon which device A sends the encrypted identifier X to device D, upon which device D forwards the encrypted identifier X to device B.

In the third embodiment, the system consists of the following devices. Device A and B having the same roles as above, but may or may not be including an encrypted credential as part of the emergency call. Further mobile devices {D0, . . . , Dn} are capable of performing wireless distance measurement and/or angle detection, e.g. using a Time-Difference-of-Arrival over a ProSe sidelink channel (e.g. PC5 of Wi-Fi Aware) and/or using Wi-Fi fine-time measurement (e.g. as part of Wi-Fi Aware ranging) and/or using Bluetooth angle-of-arrival detection and/or using distance measurement using wireless signal strength measurements (e.g. using PC5, Wi-Fi, Bluetooth).

In one embodiment device B is communicatively coupled to a service T operating in the mobile operator's core network. Service T is able to determine the location and/or requesting the location information of device A, e.g. from a location service/entity in the core network (e.g. GMLC or E-SMLC, see e.g. https://www.cisco.com/c/en/us/td/docs/wireless/asr_5000/20/MME/b_20_MME_Admin/b_20_MME_Admin_chapter_011110.pdf). Service T is further able to determine a set of mobile devices {K0, . . . , Km} in the vicinity of device A, e.g. by requesting a list of devices connected to the same eNB as device A (e.g. from the eNB itself, the MME, the GMLC or E-SMLC or other core network service). Service T further is able to determine the capabilities of devices {K0, . . . , Km} (e.g. from the eNB, the MME or other core network service, or by requesting the capabilities from the devices {K0, . . . , Km} through a UECapabilityEnquiry RRC message), and selecting a subset of devices {D0, . . . , Dn} of devices {K0, . . . , Km} capable of performing wireless distance measurement and/or angle estimation.

Service T sends a message Mx (0≤x≤n) to each of the mobile devices Dx of the set of mobile devices {D0, . . . , Dn}, message Mx containing instructions and optionally also authorization credentials to participate in performing distance measurement and/or angle estimation with mobile device A, and further sending a message N to mobile device A containing instructions and optionally also authorization credentials to participate in distance measurement and/or angle estimation with mobile devices{D0, . . . , Dn}. Optionally, a popup is shown asking the user of the device for approving to participate in the more accurate distance measurement. Alternatively, when the users are not asked, their distance data gets anonymized. Mobile device A and mobile devices {D0, . . . , Dn} subsequently performing distance measurements and/or angle estimations, and sending the results of the distance and/or angle measurements to service T. Service T (or other service in the core network to which T is communicatively coupled or device A) using the received distance (and possibly angle) measurements for improved location estimation of device A, and inserting the improved location estimation as part of the cellular emergency communication session setup with a destination device B (e.g. by the MME, GMLC, E-SMLC or other core network service/function).

In a further embodiment, service T also issues a request to the eNB to which device A is connected and all the neighboring eNB to participate in the distance measurement/angle detection as well, and preferably perform distance measurement/angle detection not only with device A but also with devices {D0, . . . , Dn}

In an alternative embodiment, the emergency entity (i.e. device B) receives the location of the device A making the emergency call, as generally provided during emergency calls (e.g. as specified in TS 23.167 Section 7.6), since this is mandatory legislative requirement in many countries, such as the FCC's E911 mandate (see https://www.fcc.gov/general/9-1-1-and-e9-1-1-services). After receiving the location of device A, device B may request service T to provide a more accurate position estimation of the device A making the emergency call. To this end device B can send the received location information to service T or service T requests this information from a location service/entity in the core network (e.g. GMLC or E-SMLC, see e.g. https://www.cisco.com/c/en/us/td/docs/wireless/asr_5000/20/MME/b_20_MME_Admin/b_20_MME_Admin_chapter_011110.pdf), after which service T performs the procedures as described above to use the set of devices {D0, . . . , Dn} in vicinity of device A to perform distance measurement and/or angle estimation.

In another alternative, the emergency call may be made through an indirect network connection using one or more relay devices (e.g. ProSe UE-to-UE relay, UE-to-Network relay, or multi-hop relay UE), whereby the mobile device making the emergency call acts as a remote UE (as specified in 3GPP TS 23.303). Not all relay devices may be within the direct coverage area/communication range of an eNodeB base station, but are attached to the network by relaying their data through one another until it reaches a relay device (so-called UE-to-Network relay) that is able to reach the network. All relay devices and the remote device making the emergency call however could be capable of participating in position estimation and distance measurement between each other. In one embodiment, the devices (and possibly also all other devices that could be reached through an indirect connection via one or more of the respective relay devices) are instructed by the network to participate in distance measurement using the mechanisms as specified above. In another embodiment, all the devices through which the emergency call is passed through before it reaches the eNodeB automatically switch on their distance measurement capability and perform distance measurement between the remote UE and the relay device, and possibly also between the relay device and all previous relay devices in the indirect communication path, after which this information is gathered and sent to a location service in the core network, e.g. along with the emergency communication.

Figure 3:
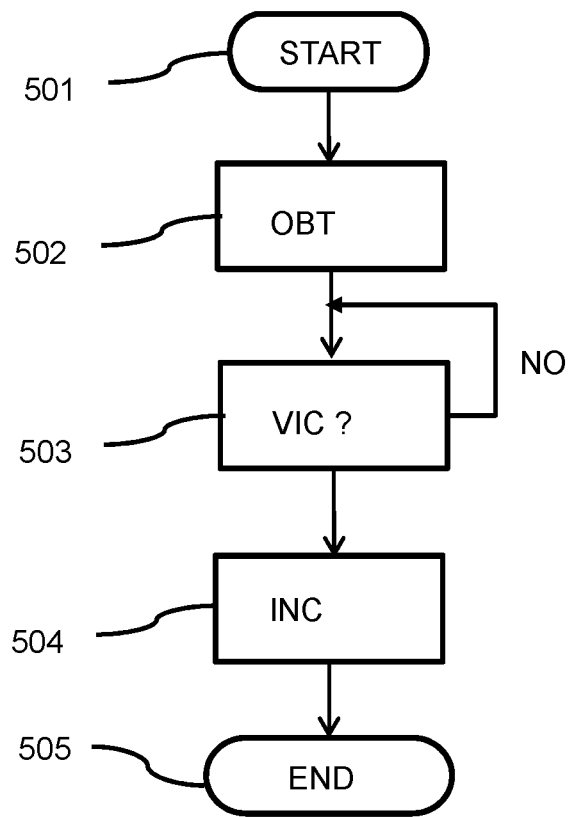
FIG. 3 shows a method for use in a mobile device arranged for wireless communication in a mobile network.

FIG. 3 shows a method for use in a mobile device arranged for wireless communication in a mobile network. The mobile network, the medical database, the encrypted medical identifier, the emergency entity and a mobile device as such have been described above with FIG. 1.

In the method, an emergency process is executed and starts at node START 501. In a first stage OBT 502 the process obtains the encrypted medical identifier of a user of the device. For example, the medical identifier may be prepared by encrypting the medical identifier in a secure processor e.g. (e)SIM of the mobile device. The encrypted medical identifier may be retrieved from the secure processor e.g. (e)SIM. Subsequently, in a stage VIC? 503, the process establishes that the user may be a victim of the emergency, for example by detecting that a call to an emergency number is made. If not, the process continues by monitoring emergency indicators as indicated by the upward arrow. If so established, the method proceeds in stage INC 504 by including the encrypted medical identifier in the emergency message during an emergency call. Additionally further data may be included, such as location information and other medical information, e.g. heart rate derived from the mobile device of the victim. Then the process is terminated in node END 505.

Figure 4:
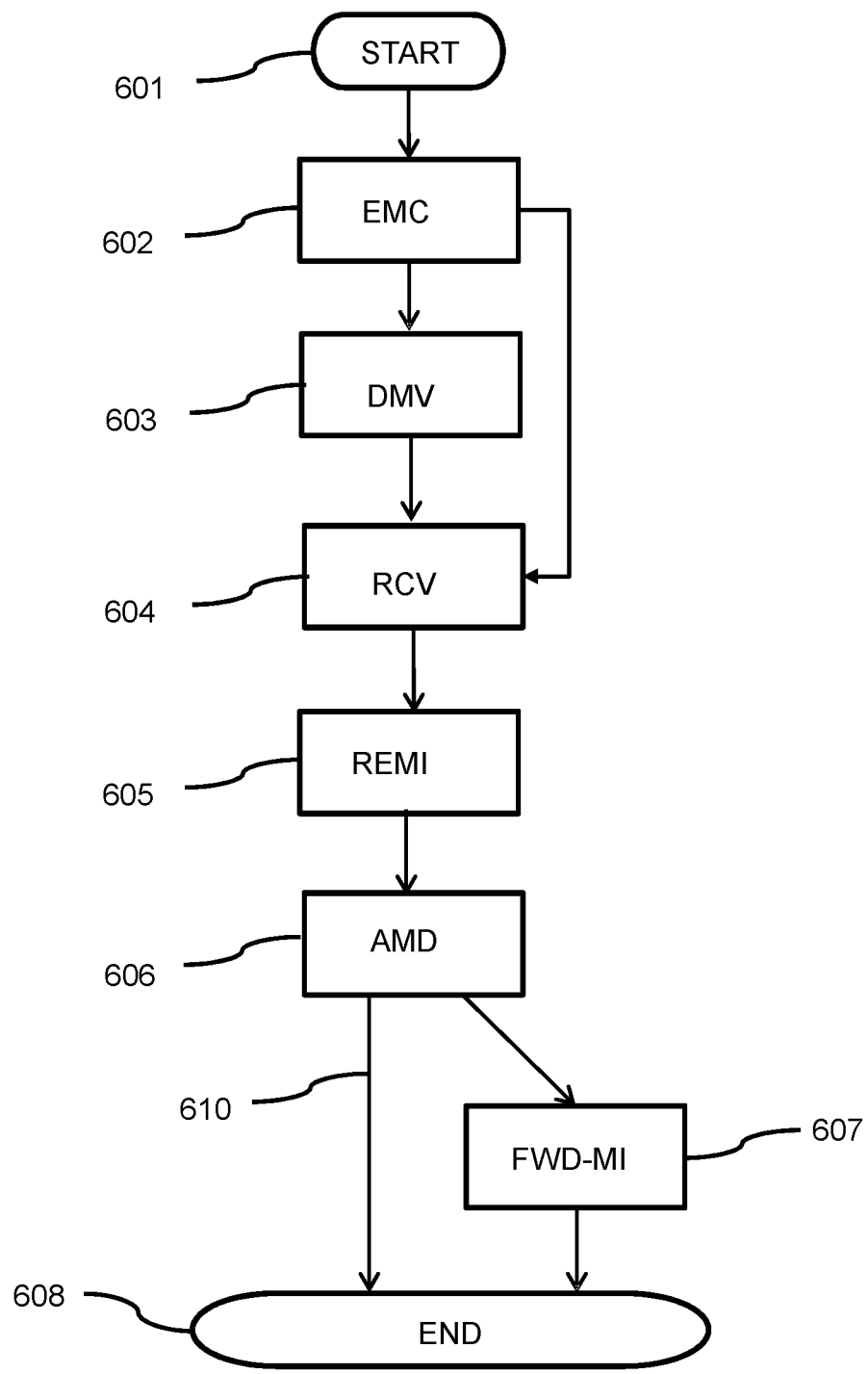
FIG. 4 shows a method for use in an emergency entity to be arranged in a mobile network.

FIG. 4 shows a method for use in an emergency entity to be arranged in a mobile network. The mobile network, the medical database, the encrypted medical identifier, the mobile device and the emergency entity as such have been described above with FIG. 1.

In the method, an emergency process is executed and starts at node START 601. In a first stage EMC 602 an emergency call set up is detected. The method continues with stage DMV 603 for determining the mobile phone of the victim. When the mobile phone of the victim makes the emergency call, that mobile phone will send the emergency message as described above. So, during the emergency call, in a stage RCV 604 the emergency message is automatically received from the mobile device that establishes that the user may be a victim of an emergency.

Alternatively, an emergency call may be arriving at the emergency entity from a further mobile device, e.g. from a bystander, spectator or responder to an emergency. In this case, stage DMV 603 proceeds by determining which mobile device is the mobile device of the victim. Various ways of discovering the victim's mobile device have been discussed above, such as using a location service to find the mobile device closest to the mobile device making the emergency call. Upon determining the victim's mobile device, a request message is transferred via the network to the victim's mobile device. The request message requests to include an encrypted medical identifier of a user of the respective mobile device in an emergency message. In this case, in stage RCV 604, the emergency message is received from the mobile device that received the request message.

In a stage REMI 605, the method proceeds by retrieving the encrypted medical identifier from the emergency message. Then, in a stage AMD 606, the medical database is accessed to retrieve at least one electronic health record (EHR) based on the encrypted medical identifier. Subsequently, the method may automatically select the first responders based on real-time information e.g. location, readiness, expertise of first responders and automatically forward information from the electronic health record to responders to the emergency in a stage FMI 607. Also, the location information of the victim's mobile device may be forwarded. Alternatively, the forwarding may also be performed by a human operator at the emergency entity, as schematically indicated by arrow 610. The method is terminated in node END 608.

Many different ways of implementing the methods are possible, as will be apparent to a person skilled in the art. For example, the order of the stages or steps can be varied or some stages may be executed in parallel. Moreover, in between steps other method steps may be inserted. The inserted steps may represent refinements of the method such as described herein or may be unrelated to the method.

Computer program products, downloadable from a network and/or stored on a computer-readable medium and/or microprocessor-executable medium, are provided that comprise program code instructions for implementing the above method, connection sequence, security process and further operations when executed on a computer device. So, the method according to the invention may be executed using software, which comprises instructions for causing a processor system to perform the respective method.

Typically, the mobile device and the emergency entity device that interact to execute the emergency call, each comprise a processor coupled to a memory containing appropriate software code stored at the devices; for example, that software may have been downloaded and/or stored in a corresponding memory, e.g., a volatile memory such as RAM or a non-volatile memory such as Flash (not shown). The devices may for example be equipped with microprocessors and memories (not shown). Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5A:
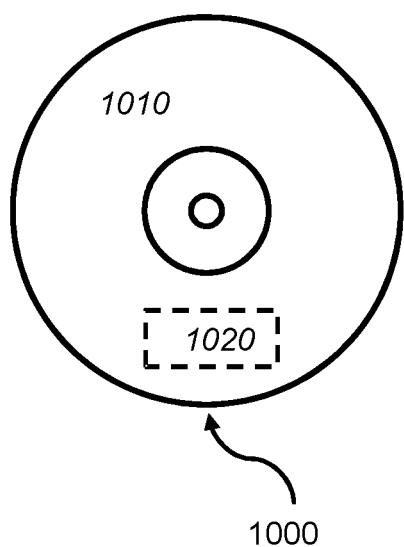
FIG. 5*a* shows a computer readable medium.

FIG. 5*a* shows a computer readable medium 1000 having a writable part 1010 comprising a computer program 1020, the computer program 1020 comprising instructions for causing a processor system to perform one or more of the above methods and processes in the system as described with reference to FIGS. 1-4. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 5B:
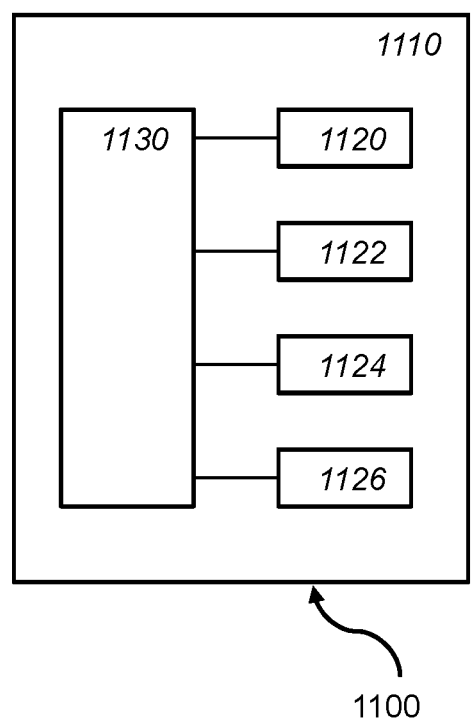
FIG. 5*b* shows in a schematic representation of a processor system.

FIG. 5*b* shows in a schematic representation of a processor system 1100 according to an embodiment of the devices or methods as described with reference to FIGS. 1-4. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the verb 'comprise' does not exclude the presence of elements or steps other than those listed and the word 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. Any reference signs do not limit the scope of the claims. The invention may be implemented by means of both hardware and software. Several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

In summary, a mobile device and an emergency entity in a mobile network accommodate emergency calls. The network is coupled to a medical database comprising respective electronic health records regarding respective persons. The mobile device is arranged to obtain the encrypted medical identifier of a user of the device; and, upon establishing that the user may be a victim of the emergency, to include the encrypted medical identifier in the emergency message during an emergency call. The emergency entity is arranged to retrieve the encrypted medical identifier from the emergency message, and to access the medical database to retrieve at least one electronic health record based on the encrypted medical identifier for enabling forwarding of information from the electronic health record to responders to an emergency.

The invention claimed is:

1. A mobile device arranged for emergency communication in a mobile network, the mobile device comprising:
   one or more computer processors;
   one or more computer readable storage devices;
   program instructions to enable an emergency call in the mobile network;
   program instructions to initiate an emergency call in response to an emergency action associated with the mobile device;
   program instructions to retrieve a first medical identifier, wherein the medical identifier is linked to a first electronic health record, and
   wherein the first electronic health record is linked to a first user;
   program instructions to encrypt the first medical identifier to generate a first encrypted medical identifier; and
   program instructions to communicate with a second mobile device, wherein location data associated with the mobile device and the second mobile device is used to determine a location of the mobile device, and wherein communicating with the second mobile device further comprises sending a request to assist in determining whether the mobile device is associated with the first user.

2. The mobile device of claim 1, further comprising:
   program instructions to detect acceleration or deceleration above a predetermined limit; and
   in response to detecting acceleration or deceleration above the predetermined limit, program instructions to initiate a message indicating an availability of a first emergency call.

3. The mobile device of claim 2, further comprising:
   program instructions to initiate the first emergency call; and
   program instructions to send the first encrypted medical identifier to an emergency entity.

4. The mobile device of claim 1, further comprising:
   program instructions to detect an aberration in a sensor, wherein the sensor detects at least one vital sign of the user;
   in response to detecting the aberration in the sensor, program instructions to determine whether the aberration exceeds a predetermined limit;
   in response to determining that the aberration exceeds the predetermined limit, initiating a message indicating an availability of a first emergency call.

5. The mobile device of claim 4, further comprising:
   program instructions to initiate the first emergency call; and
   program instructions to send the first encrypted medical identifier to an emergency entity.

6. A method of arranging for emergency communication in a mobile network, the method comprising:
   enabling, by one or more processors, an emergency call in the mobile network;
   initiating, by the one or more processors, an emergency call in response to an emergency action associated with the mobile device;
   retrieving, by the one or more processors, a first medical identifier,
      wherein the medical identifier is linked to a first electronic health record, and
      wherein the first electronic health record is linked to a first user;
   encrypting, by the one or more processors, the first medical identifier to generate a first encrypted medical identifier;
   sending, by the one or more processors, the first encrypted medical identifier to an emergency entity;
   communicating with a second mobile device, wherein location data associated with the mobile device and the second mobile device is used to determine a location of the mobile device, and wherein communicating with the second mobile device further comprises sending a request to assist in determining whether the mobile device is associated with the first user.

7. The method of claim 6, further comprising:
   detecting, by the one or more processors, acceleration or deceleration above a predetermined limit; and in response to detecting acceleration or deceleration above the predetermined limit, initiating, by the one or more processors, a message indicating an availability of a first emergency call.

8. The method of claim 7, further comprising:
initiating, by the one or more processors, the first emergency call.

9. The method of claim 6, further comprising:
detecting, by the one or more processors, an aberration in a sensor, wherein the sensor detects at least one vital sign of the user;
in response to detecting the aberration in the sensor, determining, by the one or more processors, whether the aberration exceeds a predetermined limit;
in response to determining that the aberration exceeds the predetermined limit, initiating, by the one or more processors, a message indicating an availability of a first emergency call.

10. The method of claim 9, further comprising:
initiating, by the one or more processors, the first emergency call.

* * * * *